United States Patent [19]
Vogel et al.

[11] Patent Number: 5,762,381
[45] Date of Patent: Jun. 9, 1998

[54] CONNECTING APPARATUS FOR CONVEYANCE OF CRYOGENIC FLUID

[75] Inventors: Herman Vogel, Newtown; Richard T. Ferranti, Huntington, both of Conn.

[73] Assignee: The Perkin-Elmer Corporation, Norwalk, Conn.

[21] Appl. No.: 569,535

[22] Filed: Dec. 8, 1995

[51] Int. Cl.$^6$ ............................................. F16L 59/16
[52] U.S. Cl. ...................... 285/330; 285/904; 285/336; 285/363; 285/368
[58] Field of Search ........................... 285/904, 330, 285/336, 363, 368, 365–367

[56] References Cited

U.S. PATENT DOCUMENTS

| | | | |
|---|---|---|---|
| 330,624 | 11/1885 | Scaiff | 285/336 |
| 924,039 | 6/1909 | Clark | 285/336 |
| 2,878,041 | 3/1959 | Hobbs | 285/904 |
| 3,620,556 | 11/1971 | Paddington | 285/336 |
| 3,794,361 | 2/1974 | Westberg | 285/336 |
| 4,108,476 | 8/1978 | Krupp | 285/47 |
| 4,441,725 | 4/1984 | Bailey | 285/336 |
| 4,627,646 | 12/1986 | Kessel | 285/336 |

FOREIGN PATENT DOCUMENTS

| | | | |
|---|---|---|---|
| 1012286 | 7/1952 | France | 285/336 |
| 1438458 | 4/1966 | France | 285/336 |
| 2941948 | 5/1981 | Germany | |
| 8220673.2 | 1/1983 | Germany | |
| 4107652 | 9/1992 | Germany | 285/904 |
| 134706 | 11/1929 | Switzerland | 285/336 |
| 449201 | 11/1974 | U.S.S.R. | 285/904 |
| 1017166 | 1/1966 | United Kingdom | |

Primary Examiner—Eric K. Nicholson
Attorney, Agent, or Firm—Edwin T. Grimes; Herbert S. Ingham; David Aker

[57] ABSTRACT

A connecting apparatus for conveyance of cryogenic fluid has a pair of connecting members formed of thermal insulating material. Each has a flange with an axial tubular protrusion and a rim extending over the protrusion so as to form an annular cavity therebetween. Each flange and its protrusion has a central bore. When the two members are fitted together, the combined bore conveys of cryogenic fluid therethrough. The protrusions have overlapping lips with a snug fit to substantially retain the cryogenic fluid in the combined bore. A detachable retainer holds the members in union with an o-ring seal between the rims. The respective cavities form an enclosed cavity that provides thermal insulation between the ring seal and the tubular protrusions for the cryogenic fluid in the common bore.

7 Claims, 2 Drawing Sheets

CONNECTING APPARATUS FOR CONVEYANCE OF CRYOGENIC FLUID

This invention relates to conveyance of cryogenic fluid, and particularly to a connecting apparatus for such conveyance.

BACKGROUND OF THE INVENTION

There often is a requirement to quickly disconnect and quickly reconnect the ends of a pair of tubes or the like which convey a cryogenic fluid such as liquid nitrogen, oxygen, hydrogen or helium. For example, some calorimeters utilize liquid nitrogen, and there is a need for the ducting to be disconnected and reconnected easily and frequently. The connections must be capable of withstanding operational pressures which may be quite high.

Various systems are used to provide a removable connection for the conveyance of fluids in tubing. For example, a rubber tube may be pushed over the end of a rigid tube and a hose clamp applied. In another example, each of the ends of the piping to be connected may terminate in an end plate, and the end plates with an o-ring between are bolted or clamped together. Another, which is used for water hoses and is known as a "quick connect", has an o-ring or similar gasket near the end of a fitting with a spring loaded member forced against the o-ring; the member can be slid back to release the fitting. Plumbing fittings with ferrules are used to connect rigid pipes.

Conventional connectors for liquid nitrogen and the like require the use of physical means to hold parts together, and generally also require tools for connecting and reconnecting. A basic problem in cryogenic applications, such as with liquid nitrogen, is that the low temperatures embrittle o-rings or other ordinary gasket materials. Thus cryogenic ducting systems cannot utilize o-ring or similar soft gasket materials that are exposed to the low temperatures. Other gasket materials such as soft metals may also become hardened at low temperatures, or cannot be used repeatably with reliability as they are not resilient under compression. Other systems such as those using ferrule connections or hose clamps require the use of tools for screwing and unscrewing each time, which is relatively slow and inconvenient.

Therefore, an object of the invention is to provide a novel connecting apparatus for conveyance of cryogenic fluids. Another object is to provide such a device that is quick and easy to use for repeated disconnections and reconnections. A further object is to provide such a device that does not require the use of a tool for disconnections and reconnections.

SUMMARY

The foregoing and other objects are achieved, at least in part, by a connecting apparatus for conveyance of cryogenic fluid, comprising a pair of connecting members. The first member is formed of thermal insulating material configured with a first flange. A first tubular protrusion extends axially from the first flange. A first rim extends from the first flange over the first tubular protrusion so as to form a first annular cavity therebetween. The first flange with the first tubular protrusion has a first central bore extending therethrough.

The second connecting member is formed of thermal insulating material configured with a second flange. A second tubular protrusion extends axially from the second flange. A second rim extends from the second flange over the second tubular protrusion so as to form a second annular cavity therebetween. The second flange and the second tubular protrusion have a second central bore extending therethrough.

The first connecting member and the second connecting member are configured cooperatively for detachable union thereof such that, when union is effected, the first annual cavity and the second annular cavity form an enclosed cavity, and the first central bore and the second central bore effect a combined bore for conveyance of cryogenic fluid therethrough. The first tubular protrusion and the second tubular protrusion have cooperative joining means to substantially retain the cryogenic fluid in the combined bore.

A detachable retaining means retains the first member and the second member in union. A ring seal is disposed between the first rim and the second rim when union is effected. The enclosed cavity thereby provides thermal insulation between the ring seal and the joining means for the cryogenic fluid in the common bore.

DETAILED DESCRIPTION

The present invention is directed to the conveyance of a cryogenic fluid. As used herein and in the claims, the term "cryogenic fluid" means a low temperature gas or liquid obtained from the low temperature liquified phase of a substance that is otherwise gaseous at atmospheric temperature and pressure, such as liquid nitrogen, oxygen, hydrogen, helium or argon.

Figure 1:
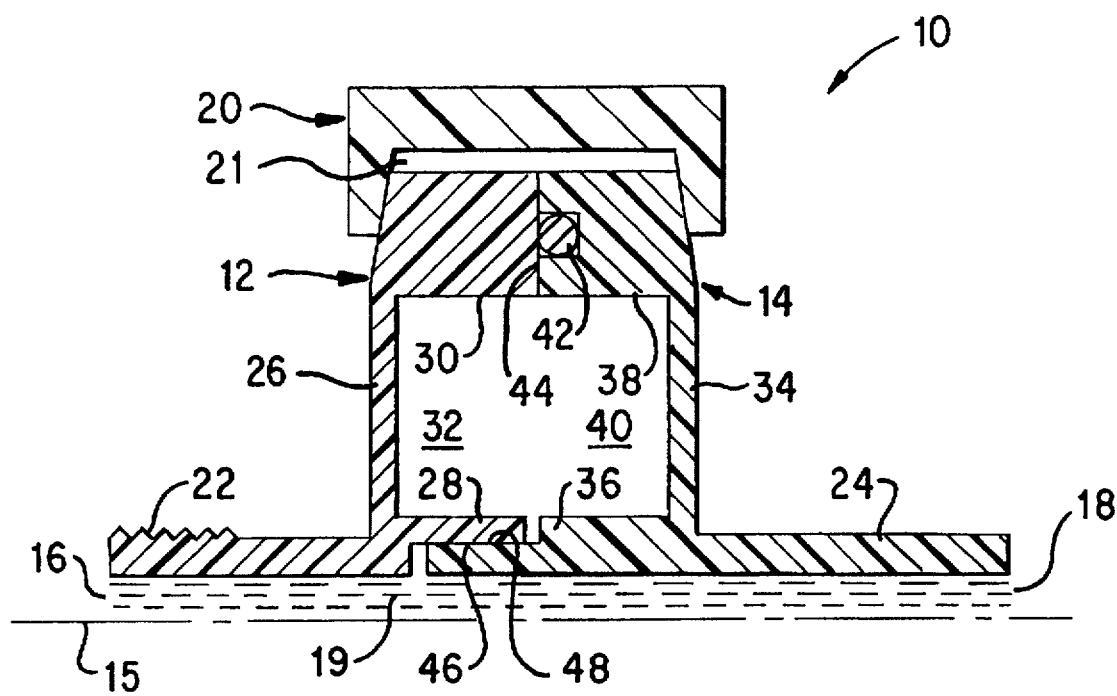
FIG. 1 is a longitudinal half section of an apparatus of the invention.
Figure 2:
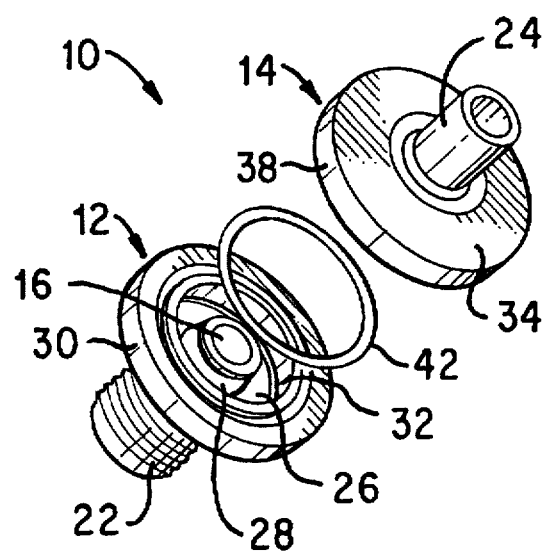
FIG. 2 is a perspective of detached components of the apparatus of FIG. 1.
Figure 3:
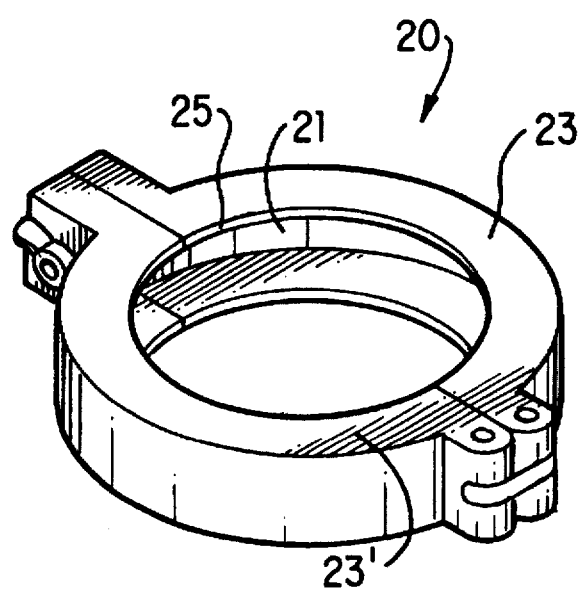
FIG. 3 is a perspective of a clamp utilized in the apparatus of FIG. 1.

A connecting apparatus 10 according to the invention includes a first connecting member 12 and a second connecting member 14, each being annular in shape about an axis 15. Each may be metallic but preferably is formed of a thermal insulating material such as a ceramic or advantageously a hydrocarbon-based polymer such as General Electric Ultrem™ which is slightly resiliant. The two members are configured cooperatively for detachable union thereof (FIG. 1), and may be disconnected (FIG. 2). The first member and the second member respectively have a first central bore 16 and a second central bore 18 therethrough so as to effect a combined central bore 16, 18 for conveyance of cryogenic fluid 19 therethrough when the members are retained together in union.

The retaining of the members may be effected by any convenient means such as quick connect clamp 20 known as a "Marmon clamp" used in vacuum systems (details not shown as this type of clamp is conventional). This comprises a pair of semi-cylindrical members 23, 23' or half shells each having a radially inner surface 25 with a semi-annular slot 21 therein. The slots are sized to fit tightly over the first member and the second member when union of the members is effected. A spring clip may be fitted in each slot for tight retention. The half shells may be held together by a hinge at one side, and a conventional slip-in hand screw pivoting into in aligned slots at the other side, so that the shells are readily put in place or removed from retension of the connecting members. Complimentary tapers of the members and clamp enhance ease of use.

Attachments of the members 12, 14 to external tubing (not shown) or other conveyance devices for the cryogenic fluid may be made by any conventional or other desired means. For example, the first member may have external threading 22 for connection to matching threading in a pipe fitting. The other member may have a straight end 24 for a hose held on by a hose clamp. Another example is ferrule connection. One of the external connections would ordinarily lead to a source such as a pressurized container of cryogenic fluid such as liquid nitrogen, and the other external connection may lead to a point of use such as a calorimetric instrument; it does not matter which lead is which.

The first member 12 is formed of a first flange 26 extending outward radially from the first central bore 16. A first tubular protrusion 28, with the first central bore continuing therethrough, extends coaxially from the first flange. A rim 30 extends coaxially from the perimeter of the flange out over the protrusion, so as to form a first annular cavity 32 between the protrusion and the rim, the cavity being bounded on the side by the flange 26.

Similarly, the second member 14 is formed of a second flange 34 extending outward radially from the second central bore 18, a second tubular protrusion 36 with the second central bore 18 therein extending from the second flange, and a second rim 38 extending from the second flange over the second tubular protrusion so as to form a second annular cavity 40 therebetween. A ring seal, which advantageously is an o-ring 42 set in an annular groove in the face 44 of one of the rims, is disposed between the respective rims 30, 38.

Inwardly, with the first member and the second member in union, the first tubular protrusion 28 and the second tubular protrusion 36 have cooperative joining means to substantially retain the cryogenic fluid. Such means may comprise flat surfaces or cooperatively configured ends of the protrusion urged in contact. Preferably, as shown, one protrusion 28 has a lip 46 having an internal diameter essentially equal to the outside diameter of a complimentary lip 48 of the other protrusion 36, so that the lips of the first tubular protrusion and the second tubular protrusion have a snug concentric fit that is comfortably removable. This should prevent significant outward flow of liquid from the central bore 16, 18, but need not be a perfect seal as explained below.

When the two members 12, 14 are positioned in union, the first annular cavity 32 and the second annular cavity 40 form a combined, enclosed cavity 32, 40. This combined cavity will contain air initially, but some vaporized cryogenic fluid leaking from the bore 16, 18, particularly if under pressure, will enter the cavity. The gas in the cavity will effect thermal insulation between the ring seal and the cryogenic liquid 19 in the common bore. This insulation is particulaly important to isolate the oring material from the cryogenic temperature and damaging embrittlement that otherwise could occur.

A connecting apparatus as described herein can easily be disconnected and reconnected. It particulary is capable of use with cryogenic systems under very high pressure, for example up to 70 kg/cm² (1000 psi). With a combined cavity having a radial thickness of about 4 mm, and an axial width of about 8 mm, conveyance of liquid nitrogen can be achieved in ordinary room conditions without frosting of outside of the assembly.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A connecting apparatus for conveyance of cryogenic fluid, comprising:

a first connecting member formed of thermal insulating material configured with a first flange, a first tubular protrusion extending axially from the first flange, and a first rim extending from the first flange over the first tubular protrusion so as to form a first annular cavity therebetween, the first tubular protrusion having a first central bore extending therethrough;

a second connecting member formed of thermal insulating material configured with a second flange, a second tubular protrusion extending axially from the second flange, and a second rim extending from the second flange over the second tubular protrusion so as to form a second annular cavity therebetween, the second tubular protrusion having a second central bore extending therethrough, the first connecting member and the second connecting member being configured cooperatively for detachable union thereof such that, when union is effected, the first annual cavity and the second annular cavity form an enclosed cavity containing air, the first central bore and the second central bore effect a combined bore for conveyance of cryogenic fluid therethrough, and the first tubular protrusion and the second tubular protrusion have cooperative joining means with a snug fit to substantially retain the cryogenic fluid in the combined bore;

detachable retaining means for retaining the first member and the second member in union; and a ring seal disposed between the first rim and the second rim when union is effected, the snug fit being non-sealing such that vaporized cryogenic fluid leaks from the combined bore into the enclosed cavity, whereby the enclosed cavity further contains such vaporized fluid and thermal insulation is provided between the ring seal and the cryogenic fluid in the combined bore.

2. The apparatus of claim 1 wherein the thermal insulating material comprises a polymer.

3. The apparatus of claim 2 wherein the joining means comprises the first tubular protrusion and the second tubular protrusion having a snug concentric fit.

4. The apparatus of claim 3 wherein the ring seal comprises an o-ring seal.

5. The apparatus of claim 1 wherein the ring seal comprises an o-ring seal.

6. The apparatus of claim 1 wherein the retaining means comprises a pair of semi-cylindrical members each having a radially inner surface with a semi-annular slot therein, each slot fitting snugly over the first member and the second member when union is effected.

7. The apparatus of claim 1 wherein the snug fit is concentric.

* * * * *